US012573024B2

(12) United States Patent
Sherman et al.

(10) Patent No.: US 12,573,024 B2
(45) Date of Patent: Mar. 10, 2026

(54) IMAGE AUGMENTATION FOR MACHINE LEARNING BASED DEFECT EXAMINATION

(71) Applicant: Applied Materials Israel Ltd., Rehovot (IL)

(72) Inventors: Boris Sherman, Rehovot (IL); Boris Levant, Rehovot (IL); Ran Yacoby, Jerusalem (IL); Botser Reshef, Shoham (IL); Tomer Yeminy, Givat Shmuel (IL)

(73) Assignee: Applied Materials Israel Ltd., Rehovot (IL)

( * ) Notice: Subject to any disclaimer, the term of this patent is extended or adjusted under 35 U.S.C. 154(b) by 451 days.

(21) Appl. No.: 17/947,989

(22) Filed: Sep. 19, 2022

(65) Prior Publication Data

US 2024/0095903 A1 Mar. 21, 2024

(51) Int. Cl.
*G06T 7/00* (2017.01)
*G06V 10/74* (2022.01)
(Continued)

(52) U.S. Cl.
CPC ............ *G06T 7/001* (2013.01); *G06V 10/759* (2022.01); *G06V 10/761* (2022.01);
(Continued)

(58) Field of Classification Search
CPC ... G06T 7/0002; G06T 7/0004; G06T 7/0008; G06T 7/001; G06T 2207/20081; G06T 2207/20224; G06T 2207/20212; G06T 2207/30148; G06T 2207/30108; G06T 2207/30136; G06T 7/11; G06T 7/187; G06T 2207/20104; G06V 10/761;
(Continued)

(56) References Cited

U.S. PATENT DOCUMENTS

2007/0045538 A1* 3/2007 Ikeda ...................... G06T 7/001
250/310
2007/0156379 A1* 7/2007 Kulkarni ........... H01L 21/67005
703/14
(Continued)

OTHER PUBLICATIONS

Morago B, Bui G, Duan Y. An ensemble approach to image matching using contextual features. IEEE Transactions on Image Processing. Jul. 15, 2015;24(11):4474-87. (Year: 2015).*

*Primary Examiner* — Oneal R Mistry
*Assistant Examiner* — Duy Tran
(74) *Attorney, Agent, or Firm* — Lowenstein Sandler LLP

(57) ABSTRACT

There is provided a system and method for defect examination on a semiconductor specimen. The method comprises obtaining an original image of the semiconductor specimen, the original image having a first region annotated as enclosing a defective feature; specifying a second region in the original image containing the first region, giving rise to a contextual region between the first region and the second region; identifying in a target image of the specimen a set of candidate areas matching the contextual region in accordance with a matching measure; selecting one or more candidate areas from the set of candidate areas; and pasting the first region or part thereof with respect to the one or more candidate areas, giving rise to an augmented target image usable for defect examination on the semiconductor specimen.

20 Claims, 4 Drawing Sheets

(51) Int. Cl.
*G06V 10/75* (2022.01)
*G06V 10/774* (2022.01)

(52) U.S. Cl.
CPC .. *G06V 10/774* (2022.01); *G06T 2207/20081*
(2013.01); *G06T 2207/20224* (2013.01); *G06T*
*2207/30148* (2013.01)

(58) Field of Classification Search
CPC .... G06V 10/759; G06V 10/774; G06V 10/80;
G06V 10/809; G06V 10/22; G06V
10/225; G06V 10/26; G06V 10/267;
G06V 10/25; G06V 10/255
See application file for complete search history.

(56) References Cited

U.S. PATENT DOCUMENTS

| | | | | |
|---|---|---|---|---|
| 2009/0214122 | A1* | 8/2009 | Ikeda | G01N 21/95607 |
| | | | | 382/209 |
| 2011/0069894 | A1* | 3/2011 | Vans | G06V 10/993 |
| | | | | 382/218 |
| 2013/0336573 | A1* | 12/2013 | Dalla-Torre | G06T 7/001 |
| | | | | 382/145 |
| 2017/0148153 | A1* | 5/2017 | Nakao | G06T 7/0004 |
| 2017/0358071 | A1* | 12/2017 | Yamaoka | H04N 7/183 |
| 2020/0226420 | A1* | 7/2020 | Shaubi | G06V 10/774 |
| 2020/0234417 | A1* | 7/2020 | Cohen | G06T 7/001 |

* cited by examiner

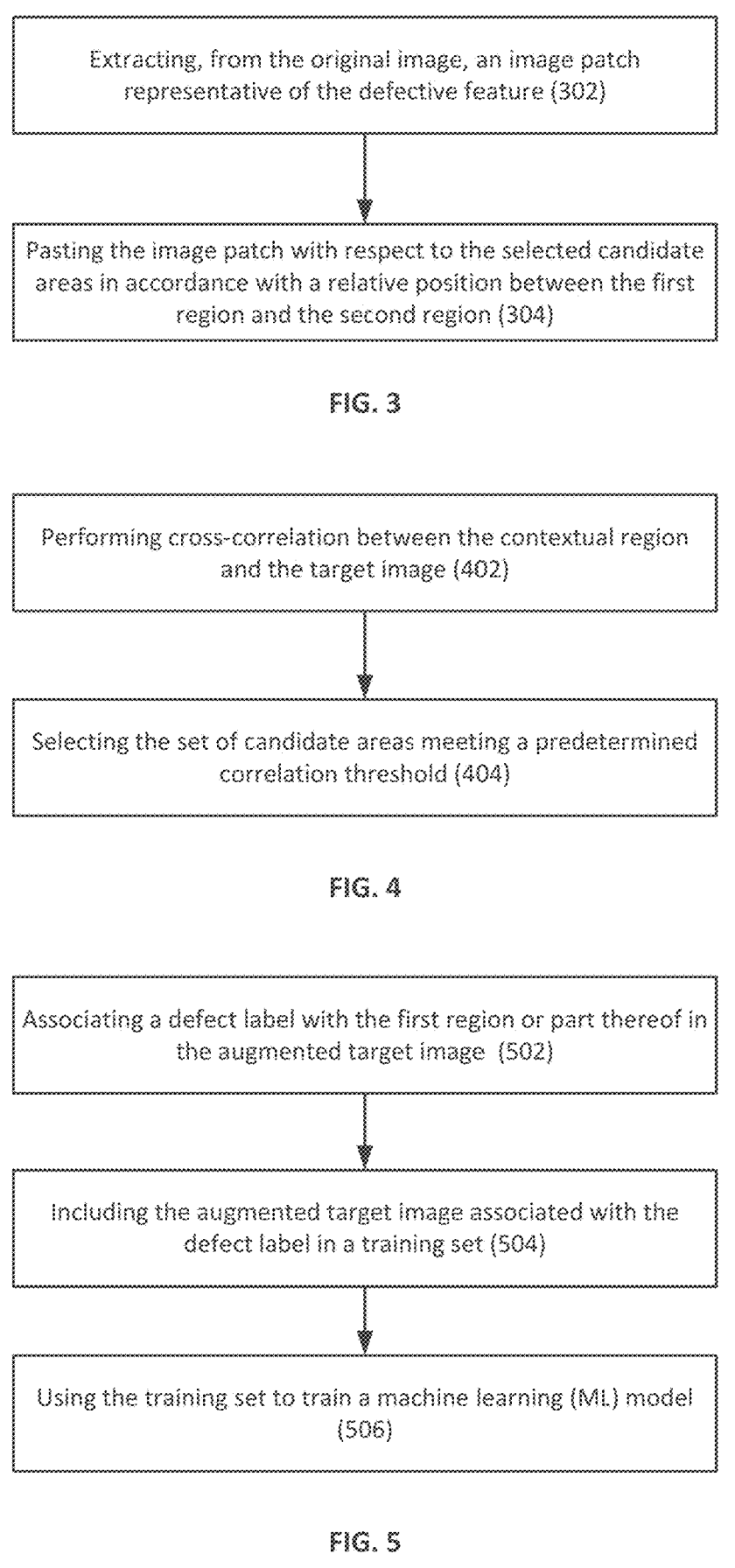

Extracting, from the original image, an image patch representative of the defective feature (302)

Pasting the image patch with respect to the selected candidate areas in accordance with a relative position between the first region and the second region (304)

FIG. 3

Performing cross-correlation between the contextual region and the target image (402)

Selecting the set of candidate areas meeting a predetermined correlation threshold (404)

FIG. 4

Associating a defect label with the first region or part thereof in the augmented target image (502)

Including the augmented target image associated with the defect label in a training set (504)

Using the training set to train a machine learning (ML) model (506)

FIG. 5

IMAGE AUGMENTATION FOR MACHINE LEARNING BASED DEFECT EXAMINATION

TECHNICAL FIELD

The presently disclosed subject matter relates, in general, to the field of examination of a semiconductor specimen, and more specifically, to machine-learning based defect examination on a specimen.

BACKGROUND

Current demands for high density and performance associated with ultra large-scale integration of fabricated devices require submicron features, increased transistor and circuit speeds, and improved reliability. As semiconductor processes progress, pattern dimensions such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Run-time examination can generally employ a two-phase procedure, e.g., inspection of a specimen followed by review of sampled locations of potential defects. Examination generally involves generating certain output (e.g., images, signals, etc.) for a specimen by directing light or electrons to the wafer, and detecting the light or electrons from the wafer. During the first phase, the surface of a specimen is inspected at high-speed and relatively low-resolution. Defect detection is typically performed by applying a defect detection algorithm to the inspection output. A defect map is produced to show suspected locations on the specimen having high probability of being a defect. During the second phase, at least some of the suspected locations are more thoroughly analyzed with relatively high resolution, for determining different parameters of the defects, such as classes, thickness, roughness, size, and so on.

Examination can be provided by using non-destructive examination tools during or after manufacture of the specimen to be examined. Examination generally involves generating certain output (e.g., images, signals, etc.) for a specimen by directing light or electrons to the wafer and detecting the light or electrons from the wafer. A variety of non-destructive examination tools includes, by way of non-limiting example, scanning electron microscopes, atomic force microscopes, optical inspection tools, etc.

Examination processes can include a plurality of examination steps. The manufacturing process of a semiconductor device can include various procedures such as etching, depositing, planarization, growth such as epitaxial growth, implantation, etc. The examination steps can be performed a multiplicity of times, for example after certain process procedures, and/or after the manufacturing of certain layers, or the like. Additionally or alternatively, each examination step can be repeated multiple times, for example for different wafer locations, or for the same wafer locations with different examination settings.

Examination processes are used at various steps during semiconductor fabrication to detect and classify defects on specimens, as well as perform metrology related operations. Effectiveness of examination can be improved by automatization of process(es) such as, for example, defect detection, Automatic Defect Classification (ADC), Automatic Defect Review (ADR), image segmentation, automated metrology-related operations, etc. Automated examination systems ensure that the parts manufactured meet the quality standards expected and provide useful information on adjustments that may be needed to the manufacturing tools, equipment, and/or compositions, depending on the type of defects identified.

In some cases, machine learning technologies can be used to assist the examination process so as to promote higher yield. For instance, supervised machine learning can be used to enable accurate and efficient solutions for automating specific examination applications based on sufficiently annotated training images.

SUMMARY

In accordance with certain aspects of the presently disclosed subject matter, there is provided a computerized system for defect examination on a semiconductor specimen, the system comprising a processor and memory circuitry (PMC) configured to: obtain an original image of the semiconductor specimen, the original image having a first region annotated as enclosing a defective feature; specify a second region in the original image containing the first region, giving rise to a contextual region between the first region and the second region; identify, in a target image of the semiconductor specimen, a set of candidate areas matching the contextual region in accordance with a matching measure; select one or more candidate areas from the set of candidate areas; and paste the first region or part thereof with respect to the one or more candidate areas, giving rise to an augmented target image usable for defect examination on the semiconductor specimen.

In addition to the above features, the system according to this aspect of the presently disclosed subject matter can comprise one or more of features (i) to (xi) listed below, in any desired combination or permutation which is technically possible:

(i). The PMC is further configured to extract, from the original image, an image patch representative of the defective feature. The pasting comprises pasting the image patch with respect to the selected candidate areas in accordance with a relative position between the first region and the second region.

(ii). The image patch is extracted by subtracting a reference image from the original image, the reference image being a defect-free image corresponding to the original image.

(iii). The image patch is extracted by subtracting a reference region from the second region, the reference region being selected from the one or more candidate areas.

(iv). The second region is defined based on one of: a contextual pattern of the defective feature, or a predetermined parameter indicative of a distance between contours of the first region and the second region.

(v). The matching measure is correlation-based matching, and the set of candidate areas are identified by performing cross-correlation between the contextual region and the target image, and selecting the set of candidate areas meeting a predetermined correlation threshold.

(vi). The matching measure is feature-based matching, and the one or more candidate areas are identified by identifying, respectively for the contextual region and the target image, one or more key points invariant to pattern variations, computing respective local descriptors characterizing the key points of the contextual region and the target image, and comparing the respective local descriptors to find matching key points between the contextual region and the target image.

(vii). The one or more candidate areas are selected from the set of candidate areas in accordance with one of: level of similarity with respect to the contextual region, or random selection.

(viii). The PMC is further configured to manipulate one or more image characteristics of the first region or part thereof based on at least one of: geometric transformation, gray level intensity modifications, filtration, style transfer, and contrast modifications, before the pasting.

(ix). The PMC is configured to obtain a group of original images each having a respective first region annotated and enclosing a respective defective feature, and the PMC is configured to perform the specifying, identifying, selecting and pasting for each original image with respect to the target image, giving rise to an augmented target image augmented with respective defective features.

(x). The PMC is further configured to associate a defect label with the first region or part thereof in the augmented target image, include the augmented target image associated with the defect label in a training set, and use the training set to train a machine learning (ML) model.

(xi). The PMC is further configured to perform defect detection on the augmented target image using a detection algorithm and determine whether to modify the detection algorithm based on a result of the defect detection.

In accordance with other aspects of the presently disclosed subject matter, there is provided a computerized method for defect examination on a semiconductor specimen, the method comprising: obtaining an original image of the semiconductor specimen, the original image having a first region annotated as enclosing a defective feature; specifying a second region in the original image containing the first region, giving rise to a contextual region between the first region and the second region; identifying, in a target image of the semiconductor specimen, a set of candidate areas matching the contextual region in accordance with a matching measure; selecting one or more candidate areas from the set of candidate areas; and pasting the first region or part thereof with respect to the one or more candidate areas, giving rise to an augmented target image usable for defect examination on the semiconductor specimen.

This aspect of the disclosed subject matter can comprise one or more of features (i) to (xi) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a computerized method for defect examination on a semiconductor specimen, the method comprising: obtaining an original image of the semiconductor specimen, the original image having a first region annotated as enclosing a defective feature; specifying a second region in the original image containing the first region, giving rise to a contextual region between the first region and the second region; identifying, in a target image of the semiconductor specimen, a set of candidate areas matching the contextual region in accordance with a matching measure; selecting one or more candidate areas from the set of candidate areas; and pasting the first region or part thereof with respect to the one or more candidate areas, giving rise to an augmented target image usable for defect examination on the semiconductor specimen.

This aspect of the disclosed subject matter can comprise one or more of features (i) to (xi) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which:

FIG. 3 is a generalized flowchart of pasting the defective feature in the target image in accordance with certain embodiments of the presently disclosed subject matter.

FIG. 4 is a generalized flowchart of correlation-based matching between the contextual region and the target image in accordance with certain embodiments of the presently disclosed subject matter.

FIG. 5 shows a generalized flowchart of training a machine learning model trained using the synthetic defective image in accordance with certain embodiments of the presently disclosed subject matter.

DETAILED DESCRIPTION OF EMBODIMENTS

Figure 1:
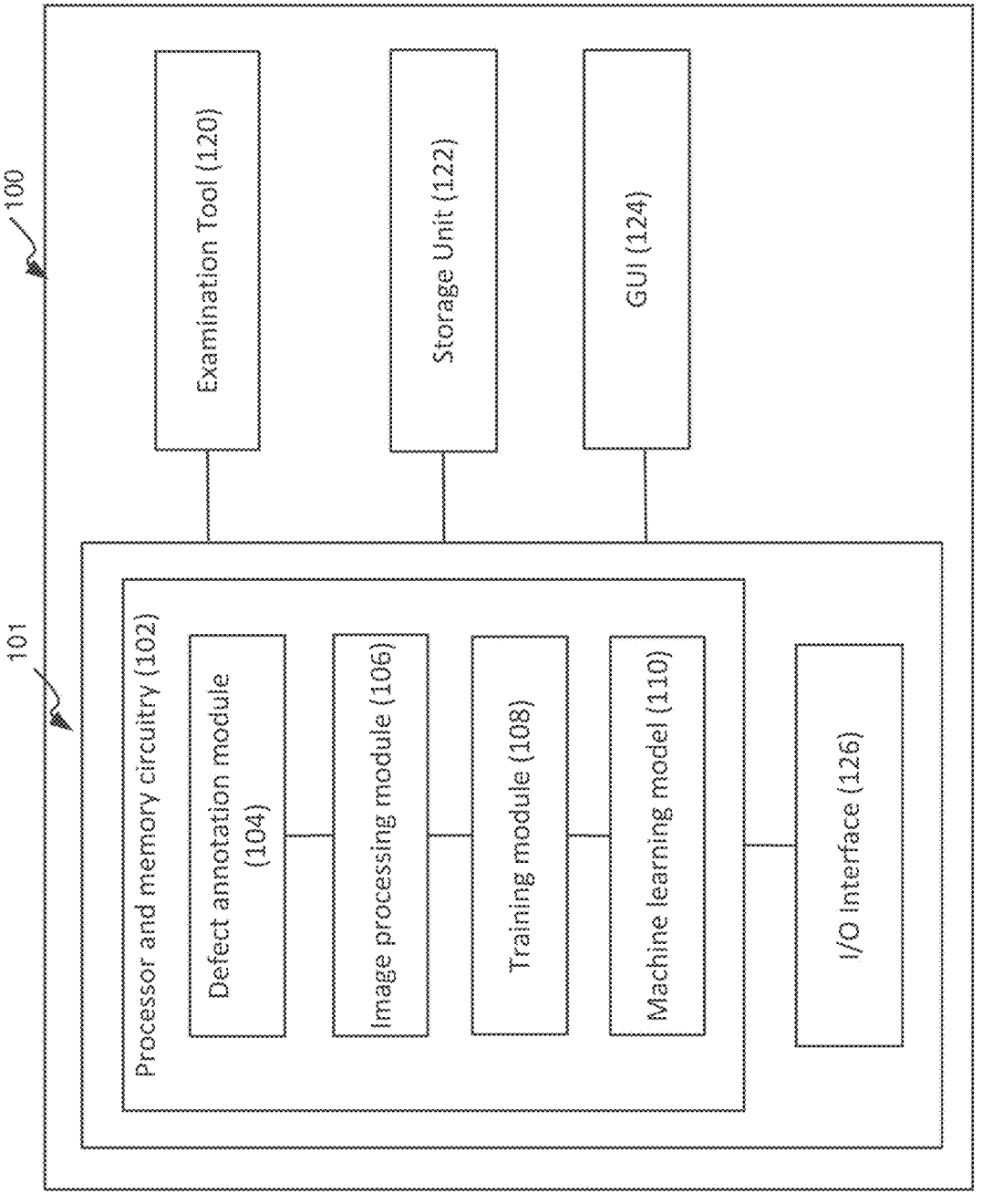
FIG. 1 illustrates a generalized block diagram of an examination system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "examining", "specifying", "identifying", "selecting", "matching", "pasting", "extracting", "subtracting", "performing", "training", "computing", "comparing", "manipulating", "associating", "including", "using", "determining", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the image augmentation system, the training system for training a machine learning model, the runtime defect examination system, and respective parts thereof disclosed in the present application.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

The term "specimen" used in this specification should be expansively construed to cover any kind of physical objects or substrates including wafers, masks, reticles, and other structures, combinations and/or parts thereof used for manufacturing semiconductor integrated circuits, magnetic heads, flat panel displays, and other semiconductor-fabricated articles. A specimen is also referred to herein as a semiconductor specimen, and can be produced by manufacturing equipment executing corresponding manufacturing processes.

The term "examination" used in this specification should be expansively construed to cover any kind of operations related to defect detection, defect review and/or defect classification of various types, segmentation, and/or metrology operations during and/or after the specimen fabrication process. Examination is provided by using non-destructive examination tools during or after manufacture of the specimen to be examined. By way of non-limiting example, the examination process can include runtime scanning (in a single or in multiple scans), imaging, sampling, detecting, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes (SEM), atomic force microscopes (AFM), optical inspection tools, etc.

The term "defect" used in this specification should be expansively construed to cover any kind of abnormality or undesirable feature/functionality formed on a specimen. In some cases, a defect may be a defect of interest (DOI) which is a real defect that has certain effects on the functionality of the fabricated device, thus is in the customer's interest to be detected. For instance, any "killer" defects that may cause yield loss can be indicated as a DOI. In some other cases, a defect may be a nuisance (also referred to as "false alarm" defect) which can be disregarded because it has no effect on the functionality of the completed device and does not impact yield.

The term "defect candidate" used in this specification should be expansively construed to cover a suspected defect location on the specimen which is detected to have relatively high probability of being a defect of interest (DOI). Therefore, a defect candidate, upon being reviewed/tested, may actually be a DOI, or, in some other cases, it may be a nuisance as described above, or random noise that can be caused by different variations (e.g., process variation, color variation, mechanical and electrical variations, etc.) during inspection.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

The process of semiconductor manufacturing often requires multiple sequential processing steps and/or layers, each one of which could possibly cause defects that may lead to yield loss. Defect examination operations, such as defect detection, defect review, and defect classification, etc., can be performed at various processing steps/layers during the manufacturing process to monitor and control the process.

As described above, machine learning (ML) technologies can be used to assist the defect examination process so as to provide accurate and efficient solutions for automating specific examination applications and promoting higher yield. For purpose of providing a well-trained, accurate ML model that is robust with respect to various variations in actual production, training images must be sufficient in terms of quantity, quality and variance, etc., and the images need to be annotated with accurate labels.

However, in some cases, such training data can be difficult to collect. By way of example, true defects (i.e., DOI) are often scarce in number, and subtle in appearance, thus tend to be buried within nuisances and noises and be very difficult to detect. Training images containing such defects are thus rare, and in some cases are poorly labeled. Therefore, training defect samples for certain types of DOIs may be very limited in number and do not include sufficient variances of the DOIs, taking into consideration different variations (such as, e.g., process variations and color variations) caused by some physical processes of the specimen.

A ML model trained with insufficient defect training samples may not be able to detect unrepresented defects in production, thus cannot meet the required detection sensitivity (e.g., the detection result may have a high false alarm rate and low capture rate of the DOIs). In addition, in some cases it may be particularly challenging to obtain label data for the DOIs, as identification of such true defects which are rare and hard to detect, typically takes time and efforts, and, in some cases, may be error prone. Inaccurate labelling can mislead the ML model, and cause the model to be unable to identify the actual DOIs, or misclassify the defects in runtime, thus affecting detection performance.

Accordingly, certain embodiments of the presently disclosed subject matter propose to use specific image augmentation techniques to generate synthetic defective images and use the generated defective images to enrich a training set for training a ML model usable for defect examination. The proposed method is capable of generating synthetic defective images with high authenticity (with respect to actual defective images), thus enabling the ML model, trained using a training set enriched with such images, to have improved defect detection sensitivity, as will be detailed below.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g., a wafer, a die, or parts thereof) as part of the specimen fabrication process. As described above, the examination referred to herein can be construed to cover any kind of operations related to defect inspection/detection, defect review, defect classification, segmentation, and/or metrology operations, such as, e.g., critical dimension (CD) measurements, etc., with respect to the specimen. System 100 comprises one or more examination tools 120 configured to scan a specimen and capture images thereof to be further processed for various examination applications.

The term "examination tool(s)" used herein should be expansively construed to cover any tools that can be used in examination-related processes, including, by way of non-limiting example, scanning (in a single or in multiple scans), imaging, sampling, reviewing, measuring, classifying and/or other processes provided with regard to the specimen or parts thereof. Without limiting the scope of the disclosure in any way, it should also be noted that the examination tools 120 can be implemented as machines of various types, such as optical machines, electron beam machines (e.g., Scanning Electron Microscope (SEM), Atomic Force Microscopy (AFM), or Transmission Electron Microscope (TEM), etc.), and so on.

The one or more examination tools 120 can include one or more inspection tools and/or one or more review tools. In some cases, at least one of the examination tools 120 can be an inspection tool configured to scan a specimen (e.g., an entire wafer, an entire die, or portions thereof) to capture inspection images (typically, at a relatively high-speed and/or low-resolution) for detection of potential defects (i.e., defect candidates). During inspection, the wafer can move at a step size relative to the detector of the inspection tool (or the wafer and the tool can move in opposite directions relative to each other) during the exposure, and the wafer can be scanned step-by-step along swaths of the wafer by the inspection tool, where the inspection tool images a part/portion (within a swath) of the specimen at a time. By way of example, the inspection tool can be an optical inspection tool. At each step, light can be detected from a rectangular portion of the wafer, and such detected light is converted into multiple intensity values at multiple points in the portion, thereby forming an image corresponding to the part/portion of the wafer. For instance, in optical inspection, an array of parallel laser beams can scan the surface of a wafer along the swaths. The swaths are laid down in parallel rows/columns contiguous to one another, to build up, swath-at-a-time, an image of the surface of the wafer. For instance, the tool can scan a wafer along a swath from up to down, then switch to the next swath and scan it from down to up, and so on and so forth, until the entire wafer is scanned and inspection images of the wafer are collected.

In some cases, at least one of the examination tools 120 can be a review tool, which is configured to capture review images of at least some of the defect candidates detected by inspection tools for ascertaining whether a defect candidate is indeed a defect of interest (DOI). Such a review tool is usually configured to inspect fragments of a specimen, one at a time (typically, at a relatively low-speed and/or high-resolution). By way of example, the review tool can be an electron beam tool, such as, e.g., a scanning electron microscope (SEM), etc. SEM is a type of electron microscope that produces images of a specimen by scanning the specimen with a focused beam of electrons. The electrons interact with atoms in the specimen, producing various signals that contain information on the surface topography and/or composition of the specimen. SEM is capable of accurately inspecting and measuring features during the manufacture of semiconductor wafers.

The inspection tool and review tool can be different tools located at the same or at different locations, or a single tool operated in two different modes. In some cases, the same examination tool can provide low-resolution image data and high-resolution image data. The resulting image data (low-resolution image data and/or high-resolution image data) can be transmitted—directly or via one or more intermediate systems—to system 101. The present disclosure is not limited to any specific type of examination tools and/or the resolution of image data resulting from the examination tools. In some cases, at least one of the examination tools 120 has metrology capabilities and can be configured to capture images and perform metrology operations on the captured images. Such an examination tool is also referred to as a metrology tool.

It is to be noted that, the term "image(s)" in "original image(s)", "target image(s)", "training image(s)" and "run-time image(s)" etc. used herein can refer to images of the specimen captured by the examination tool during the manufacturing process, derivatives of the captured images obtained by various pre-processing stages, and/or computer-generated synthetic images (such as generated based on design data). It is to be noted that in some cases the images referred to herein can include image data (e.g., captured images, processed images, etc.) and associated numeric data (e.g., metadata, hand-crafted attributes, etc.). It is further noted that image data can include data related to one or more of the following: a processing step of interest, a layer of interest, a plurality of processing steps and/or a plurality of layers of the specimen.

According to certain embodiments of the presently disclosed subject matter, the examination system 100 comprises a computer-based system 101 operatively connected to the examination tools 120 and capable of performing image augmentation for generating synthetic defective images, which can be used for training a machine learning model for automatic defect examination on a semiconductor specimen. System 101 can also be referred to as an image augmentation system, a training system, and/or a defect examination system.

Specifically, system 101 includes a processor and memory circuitry (PMC) 102 operatively connected to a hardware-based I/O interface 126. The PMC 102 is configured to provide processing necessary for operating the system, as further detailed with reference to FIGS. 2-5, and comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC.

The processor referred to herein can represent one or more general-purpose processing devices such as a microprocessor, a central processing unit, or the like. More particularly, the processor may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processor may also be one or more special-purpose processing devices such as an application specific integrated circuit (ASIC), a field programmable gate array (FPGA), a digital signal processor (DSP), a network processor, or the like. The processor is configured to execute instructions for performing the operations and steps discussed herein.

The memory referred to herein can comprise a main memory (e.g., read-only memory (ROM), flash memory, dynamic random access memory (DRAM) such as synchronous DRAM (SDRAM) or Rambus DRAM (RDRAM), etc.), and a static memory (e.g., flash memory, static random access memory (SRAM), etc.).

According to certain embodiments of the presently disclosed subject matter, system 101 can be an image augmentation system configured to generate a defective image by augmenting a target image. In such cases, one or more functional modules comprised in the PMC 102 of system 101 can include a defect annotation module 104, and an image processing module 106. The PMC can be configured to obtain an original image of a semiconductor specimen, and the original image can have a first region annotated by defect annotation module 104 as enclosing a defective feature. The image processing module 106 can be configured to specify a second region in the original image containing the first region, giving rise to a contextual region (of the first region or of the defective feature) between the first region and the second region. The image processing module 106 can be further configured to identify, in a target image of the specimen, a set of candidate areas matching the contextual region in accordance with a similarity measure, select one or more candidate areas from the set of candidate areas, and paste the first region or part thereof with respect to the selected candidate areas, giving rise to an augmented target image.

According to certain embodiments of the presently disclosed subject matter, system 101 can be a training system configured to train a ML model using a training set enriched by the augmented target images. In such cases, one or more functional modules comprised in the PMC 102 of system 101 can additionally include a training module 108 and a ML model 110. The training module 108 can be configured to associate a defect label with the first region or part thereof in the augmented target image, include the augmented target image associated with the defect label in a training set, and use the training set to train the ML model 110.

According to certain embodiments of the presently disclosed subject matter, system 101 can be a runtime defect examination system configured to perform defect examination operations using the trained ML model based on runtime images obtained during specimen fabrication. In such cases, one or more functional modules comprised in the PMC 102 of system 101 can include a machine learning (ML) model 110 that was previously trained.

Specifically, the PMC 102 can be configured to obtain, via an I/O interface 126, a runtime image of the semiconductor specimen, and provide the runtime image as an input to the ML model 110 to process. The ML model 110 can generate a defect examination result corresponding to the runtime image. The ML model 110 is previously trained during setup using a training set including the augmented target image.

In such cases, the ML model 110 can be regarded as part of a defect examination recipe usable for performing runtime defect examination operations on acquired runtime images. System 101 can be regarded as a runtime defect examination system capable of performing runtime defect-related operations using the defect examination recipe.

Operation of systems 100 and 101, the PMC 102, and the functional modules therein will be further detailed with reference to FIGS. 2-5.

According to certain embodiments, the ML model 110 referred to herein can be implemented as various types of machine learning models, such as, e.g., decision tree, Support Vector Machine (SVM), Artificial Neural Network (ANN), regression model, Bayesian network, or ensembles/combinations thereof etc. The learning algorithm used by the ML model can be any of the following: supervised learning, unsupervised learning, or semi-supervised learning, etc. The presently disclosed subject matter is not limited to the specific type of ML model or the specific type or learning algorithm used by the ML model.

In some embodiments, the ML model can be implemented as a deep neural network (DNN). DNN can comprise a supervised or unsupervised DNN model which includes layers organized in accordance with respective DNN architecture. By way of non-limiting example, the layers of DNN can be organized in accordance with Convolutional Neural Network (CNN) architecture, Recurrent Neural Network architecture, Recursive Neural Networks architecture, Generative Adversarial Network (GAN) architecture, or otherwise. Optionally, at least some of the layers can be organized into a plurality of DNN sub-networks. Each layer of DNN can include multiple basic computational elements (CE) typically referred to in the art as dimensions, neurons, or nodes.

Generally, computational elements of a given layer can be connected with CEs of a preceding layer and/or a subsequent layer. Each connection between a CE of a preceding layer and a CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g., the weighted sum of the inputs) and further derive an output by applying an activation function to the computed activation. The activation function can be, for example, an identity function, a deterministic function (e.g., linear, sigmoid, threshold, or the like), a stochastic function, or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of the DNN can be initially selected prior to training, and can be further iteratively adjusted or modified during training to achieve an optimal set of weighting and/or threshold values in a trained model. A set of input data used to adjust the weights/thresholds of the DNN is referred to as a training set. Details of the training process are described below with reference to FIG. 5.

It is noted that the teachings of the presently disclosed subject matter are not bound by specific architecture of the ML model or DNN as described above.

In some cases, additionally to system 101, the examination system 100 can comprise one or more examination modules, such as, e.g., additional defect detection module, Automatic Defect Review Module (ADR), Automatic Defect Classification Module (ADC), metrology-related module, and/or other examination modules which are usable for examination of a semiconductor specimen. The one or more examination modules can be implemented as standalone computers, or their functionalities (or at least part thereof) can be integrated with the examination tool 120. In some cases, the output of system 101 can be provided to the one or more examination modules (such as the ADR, ADC, etc.) for further processing.

According to certain embodiments, system 100 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store images of the specimen and/or derivatives thereof produced by the examination tool 120, such as, e.g., the original image(s), the target image(s), the reference image(s), the training image(s), the runtime image(s), as described above. Accordingly, these input data can be retrieved from the storage unit 122 and provided to the PMC 102 for further processing. The output of the system 101, such as the augmented target image, and/or a training set, and/or defect examination data, can be sent to storage unit 122 to be stored.

In some embodiments, system 100 can optionally comprise a computer-based Graphical User Interface (GUI) 124 which is configured to enable user-specified inputs related to system 101. For instance, the user can be presented with a visual representation of the specimen (for example, by a display forming part of GUI 124), such as, e.g., the original images and target images of the specimen, etc. The user may be provided, through the GUI, with options of defining certain operation parameters, displaying and editing the images using various image editing tools, and annotating the original images or portions thereof, etc. The user may also view the operation results and/or intermediate processing results, such as, e.g., the augmented target image, the defect examination data, etc., on the GUI. In some cases, system 101 can be further configured to send certain output to the storage unit 122, and/or external systems (e.g., Yield Management System (YMS) of a fabrication plant (FAB)).

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

It is noted that the system illustrated in FIG. 1 can be implemented in a distributed computing environment, in which the aforementioned components and functional modules shown in FIG. 1 can be distributed over several local and/or remote devices, and can be linked through a communication network. By way of example, the examination tool 120 and the system 101 can be located at the same entity (in some cases hosted by the same device) or distributed over different entities. By way of another example, as described above, in some cases, system 101 can be configured as an image augmentation system for generating synthetic defective images usable for training a ML model. In some cases, system 101 can be configured as a training system for training a ML model, while in some other cases, system 101 can be configured as a runtime defect examination system using the trained ML model. The image augmentation system, the training system, and the runtime examination system can be located at the same entity (in some cases hosted by the same device), or distributed over different entities, depending on specific system configurations and implementation needs.

It is further noted that in some embodiments at least some of examination tools 120, storage unit 122 and/or GUI 124 can be external to the examination system 100 and operate in data communication with systems 100 and 101 via I/O interface 126. System 101 can be implemented as standalone computer(s) to be used in conjunction with the examination tools, and/or with the additional examination modules as described above. Alternatively, the respective functions of the system 101 can, at least partly, be integrated with one or more examination tools 120, thereby facilitating and enhancing the functionalities of the examination tools 120 in examination-related processes.

While not necessarily so, the process of operation of systems 101 and 100 can correspond to some or all of the stages of the methods described with respect to FIGS. 2-5. Likewise, the methods described with respect to FIGS. 2-5 and their possible implementations can be implemented by systems 101 and 100. It is therefore noted that embodiments discussed in relation to the methods described with respect to FIGS. 2-5 can also be implemented, mutatis mutandis as various embodiments of the systems 101 and 100, and vice versa.

Figure 2:
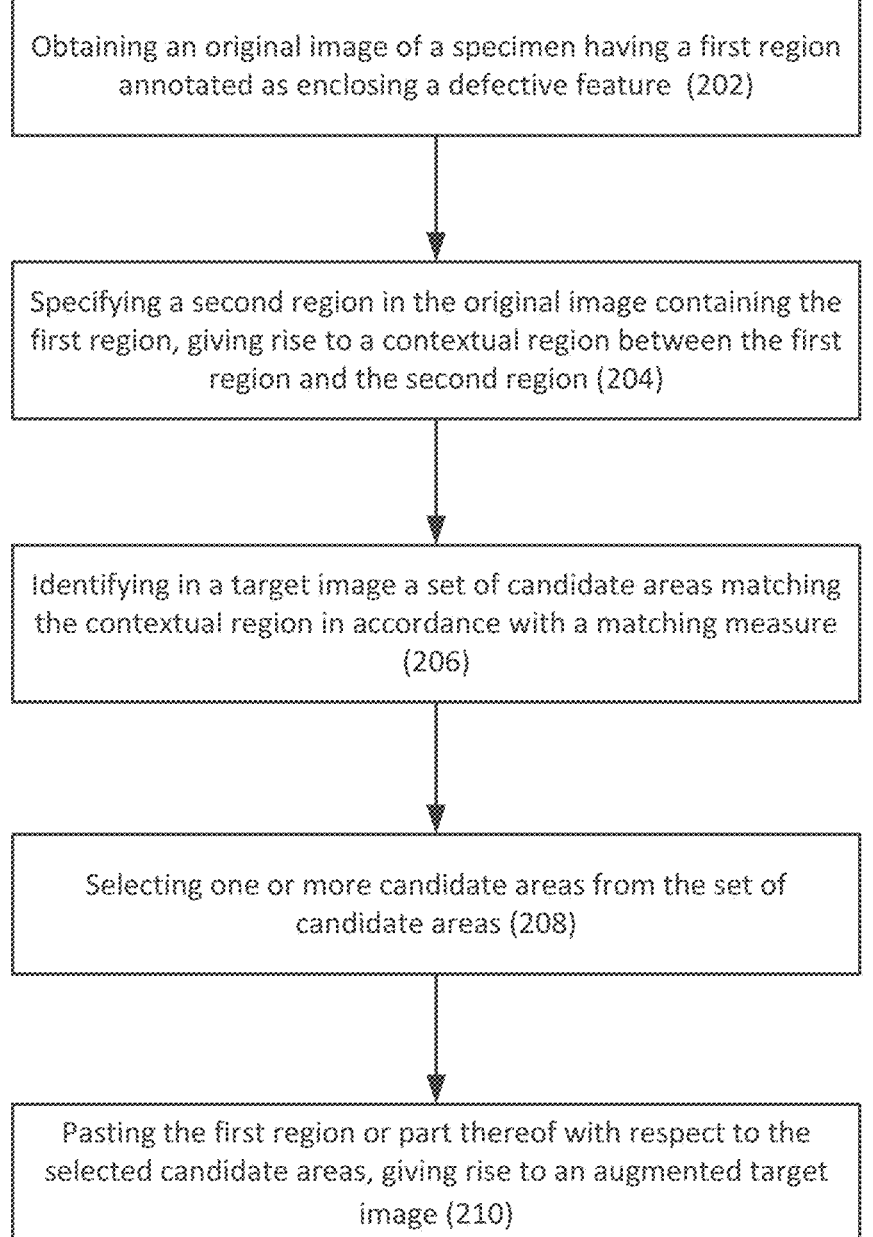
FIG. 2 illustrates a generalized flowchart of image augmentation for generating a synthetic defective image of a semiconductor specimen in accordance with certain embodiments of the presently disclosed subject matter.

Referring to FIG. 2, there is illustrated a generalized flowchart of image augmentation for generating a synthetic defective image of a semiconductor specimen in accordance with certain embodiments of the presently disclosed subject matter.

An original image of a semiconductor specimen can be obtained (202) (e.g., by the PMC 102 via the I/O interface 126). In some embodiments, the original image can be an actual image acquired by an examination tool (e.g., the examination tool 120) during a fabrication process of the specimen. By way of example, the original image can be an inspection image that an inspection tool captures from an inspection area of the specimen, or a review image captured by a review tool for ascertaining whether a defect candidate is indeed a defect of interest (DOI). The original image can be verified as containing a defective feature. A defective feature refers to an image representation of any type of actual defects (i.e., DOIs) on a specimen such as, e.g., a bridge, particles, line-cuts, etc. Such an original image is also referred to as a defective image. By way of example, in cases where the original image is an inspection image, the inspection image can be verified as a defective image in a defect detection process. In cases where the original image is a review image, the review image can be verified as a defective image in a defect review process, e.g., either in a manual review by a user or an automatic review by an ADR process.

In some embodiments, the original image can be a synthetic image of the specimen. For instance, the synthetic image can be generated based on design data. A defect can be implanted in the design data of the specimen, and a simulated image can be generated based on the design data with the implanted defect. Alternatively, the synthetic image can be generated by implanting a defect on a defect-free image.

Upon being verified as containing a defective feature, a first region of the original image can be annotated as enclosing the defective feature. The annotation can be performed either manually by a user (e.g., via the image editing tools provided by the GUI) or automatically by a defect annotation system (e.g., by the defect annotation module 104 in the PMC 102). By way of example, the first region can be annotated by drawing a shape (such as, e.g., a polygon, an ellipse, an oval, etc.) around the defective feature, such that the defective feature is enclosed/contained within the contour of the shape. Optionally, the first region can be tagged with a label indicative of the class of the defective feature. By way of example, the class can be indicative of the type of the DOI, such as a bridge, a particle, a line-cut, etc.

A second region can be specified (204) in the original image containing the first region, giving rise to a contextual region (of the defective feature or of the first region) between the first region and the second region. By way of example, the second region can be defined in accordance with a predetermined parameter indicative of the distance between the contours of the first region and the second region. For instance, assume the first region is drawn in the shape of a square (i.e., a first square), the second region can be defined as an outer square whose contour is e.g., 2 nm from the contour of the first square.

By way of another example, the second region can be defined based on a contextual pattern of the defective feature. The contextual pattern is related to the type of the defective pattern. For instance, in cases where the defect is a bridge across two line structures, the contextual pattern of the bridge refers to the two line structures which form the context or base of the defective feature, e.g., the bridge. The second region can be defined to contain at least part of the two-line structures that connects to the bridge. In cases where the defect is a line-cut in the middle of a line structure, the contextual pattern of the line-cut is the line structure. The second region can be defined to contain at least part of the line structure in which the line-cut is formed.

Similarly, the second region can be specified/defined either manually by a user (e.g., via the image editing tools provided by the GUI) or automatically (e.g., by the image processing module 106 in the PMC 102). By way of example, the second region can be defined by drawing a shape (such as, e.g., a polygon, an ellipse, an oval, etc.) outside of the first region in accordance with the above described considerations (e.g., based on a predetermined parameter indicative of the distance between the contours of the first region and the second region, or a contextual pattern of the defective feature), such that the second region contains the first region and a contextual region thereof (e.g., the surrounding region between the first region and the second region).

Figure 6:
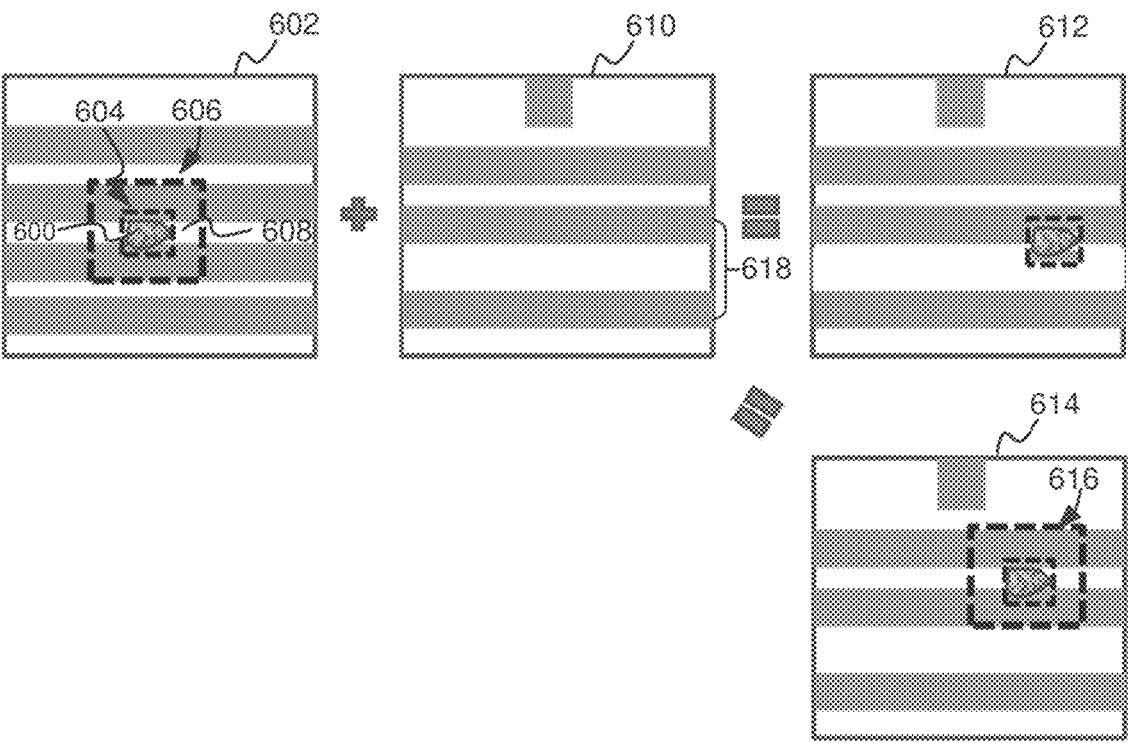
FIG. 6 shows a schematic illustration of image augmentation of a target image by pasting a region of a defective feature from an original image in accordance with certain embodiments of the presently disclosed subject matter.

FIG. 6 illustrates an example of an original image with a first region and a second region specified therein in accordance with certain embodiments of the presently disclosed subject matter. As shown, an original image 602 representative of a number of horizontal line structures is illustrated.

The original image 602 contains a defective feature 600 representative of a bridge formed between the two adjacent line structures.

A first region 604 (e.g., the inner square marked by dashed lines) is annotated in the original image 602 to enclose the defective feature 600. As illustrated, the first region 604 is annotated by drawing a rectangular shape around the defective feature 600. The first region 604 can be optionally tagged with a class label indicative of the type of the defective feature, e.g., a bridge. As described above, the first region 604 can be annotated manually by a user (e.g., the rectangular shape can be drawn by the user via the image editing tools provided by the GUI 124). Alternatively, the first region can be automatically specified by a defect annotation system upon the defective feature being identified (e.g., by the defect annotation module 104 in the PMC 102).

As shown, a second region 606 is specified in the original image 602, containing the first region 604 and a contextual region 608 of the defective feature. The contextual region 608 is illustrated as a surrounding region between the first region 604 and the second region 606. As described above, the second region 606 can be defined in accordance with a predetermined parameter indicative of the distance between the contours of the first region and the second region, or based on a contextual pattern of the defective feature. In the present example, the second region 606 can be regarded as being defined based on the contextual pattern of the bridge, i.e., the two adjacent line structures that form the base of the bridge, as it is known that a bridge is formed between two gapped structures. As exemplified, the second region 606 is defined to contain the portions of the line structures that the bridge connects to.

Continuing with the description of FIG. 2, once the first region and second region are specified, a contextual region (of the defective feature or of the first region) between the two regions is thereby provided. The contextual region is used for the purpose of searching for similar candidate areas in a target image. The term "target image" used herein refers to any image to be augmented with a defective feature so as to create a synthetic defective image. In some embodiments, the target image can be a defect-free image (i.e., a clean image) of the specimen that does not contain any defective feature. In some cases, the target image can be any image with or without any defective features. The target image may or may not share similar patterns as of the original image.

In some cases, the target image can be an actual image of a semiconductor specimen acquired by an examination tool during a fabrication process of the specimen. In some other cases, the target image, such as a defect-free image, can be simulated based on the design data of the semiconductor specimen. The design data can refer to the original design layout data of the specimen, such as CAD data, as obtained from a customer. Image simulation can be performed based on the design data to simulate one or more effects caused by one or more physical processes of the semiconductor specimen, thereby giving rise to a defect-free image. According to certain embodiments, the effects can refer to variations caused by one or more of the following physical processes: manufacturing/fabrication process of the specimen (e.g., printing the design patterns of the specimen on the wafer by a lithography tool), examination process (e.g., the scanning process and signal processing process by the examination tool), etc. In some cases, process variation (PV) and gray level (GL) variations can be considered during such simulation. The present disclosure is not limited to a specific type of the target image and/or the specific way of generating it.

A set of candidate areas can be identified (206) (e.g., by the image processing module 106 in the PMC 102) in the target image matching the contextual region in accordance with a similarity measure.

Image matching refers to finding existence of similar patterns in a target image. Image matching can be performed using various techniques/measures. Matching techniques/ measures can generally include two types: area based matching techniques, in which images are matched by numeric comparison in small portions, and feature based matching techniques, in which images are matched based on comparison of characteristics of extracted features.

Correlation-based matching is one example of area based matching measures. FIG. 4 illustrates a generalized flowchart of correlation-based matching between the contextual region and the target image in accordance with certain embodiments of the presently disclosed subject matter. By way of example, cross-correlation can be performed (402) between the image portion of the original image corresponding to the contextual region (also referred to as the image portion of the contextual region, or just contextual region for purpose of brevity) and the target image. Specifically, the image portion of the contextual region can be moved within the target image at a step size (e.g., the contextual region can move as a sliding box within the target image, step by step). Image correlation can be performed at each step between the image portion of the contextual region and the image portion in the target image that is presently covered by the contextual region. In one example, the matching can be performed using zero normalized cross-correlation.

Once the image portion of the contextual region traverses the entire target image, a correlation map can be generated based on the correlation result of each step. The correlation map comprises correlation scores representing the level of similarity between the image portion of the contextual region and each image portion along the traverse of the target image. A set of candidate areas meeting a predetermined correlation threshold can be selected (404) based on the correlation map. The set of candidate areas can include one or multiple candidate areas whose correlation scores in the correlation map meet the correlation threshold.

In some embodiments, pattern variations exist between the original image and the target image. By way of example, in some cases, the original image and the target image share the same design pattern. However, the patterns in the target image can vary from the patterns in the original image in terms of geometric transformations such as scaling, shifts, rotations, etc., gray level intensities, and/or contrast changes, etc., which may be caused by, e.g., tool drifts, process variations, and color variations, etc. In some other cases, the target image may contain a different design pattern with respect to the original image, but the patterns in the two images are still of a similar nature/type. For instance, the two images may both possess parallel line structures, but with different widths of lines and/or different distances between the lines. In these cases, feature based matching techniques, which are based on comparison of characteristics of extracted features, can be advantageous to be used.

By way of example, in order to detect descriptive yet invariant features, such as, e.g., edges, corners, textures, etc., unique key points invariant to pattern variations should be identified in each image for the purpose of locating such features. Then, a local descriptor can be computed for the content around a key point. The local descriptor refers to a vector of numbers representative of the visual characteristics of the key point. The local descriptors can be used to compare key points across different images to find matching key points. An area in the target image, having matching key points with the contextual region, is considered to be a candidate area.

For instance, Scale-Invariant Feature Transform (SIFT) is one exemplary method usable for feature extraction. SIFT is rotation-invariant and scale-invariant. For instance, SIFT searches, independently in each image, difference of Gaussians (DoG) over scale and space for local extrema, which can be used as key points. In some cases, SIFT can select key points that are more stable than others. Once a key point is found, a local descriptor can be constructed, representative of visual characteristics around the key point, yet is not sensitive to rotation and image illumination. For instance, a local descriptor is calculated as a histogram of image gradients around a key point to characterize the local appearance of the key point. The local descriptor can be used to compare key points from the contextual region of the original image to key points from the target image to find matching key points, e.g., by using Euclidean distance between the descriptors.

In some embodiments, one or more candidate areas can be selected (208) (e.g., by the image processing module 106 in the PMC 102) from the set of candidate areas. By way of example, in some cases, the set of candidate areas resulting from image matching may include a large number of candidates in the target image (such as in cases of repetitive patterns), thus making it unrealistic to perform image augmentation at all the candidate areas (e.g., by pasting the defective feature with respect to all the candidate areas). In such cases, a smaller number of candidate areas should be selected from the set of candidate areas, e.g., in accordance with a predetermined amount of candidate areas that can be selected. For instance, it is predetermined that N candidate areas or N % of the candidate areas in the set can be selected.

In one example, the N candidate areas are selected from the set of candidate areas randomly. The randomization of the selection of candidate areas can produce augmented images where the defective feature is pasted at different locations, thus increasing the variations and diversity of the augmented images. In another example, the N candidate areas are selected from the set of candidate areas according to their respective levels of similarity with respect to the contextual region (e.g., represented by the correlation score of each candidate area in the correlation map). For instance, the candidate areas with the N maximal correlation scores in the correlation map can be selected.

The first region or part thereof can be pasted (210) (e.g., by the image processing module 106 in the PMC 102) with respect to the one or more candidate areas as selected, giving rise to an augmented target image.

Referring back to FIG. 6, an exemplary target image 610 is illustrated. The target image 610 is a defect-free image having a different design pattern with respect to the original image 602. Without using the presently proposed image-matching based augmentation as described with reference to FIG. 2, the first region 604 containing the defective feature 600 may be randomly pasted in the target image as exemplified in image 612, where the defective feature 600 is partially overlapped with one line structure, while being disconnected from the other line structure. The pasted defective feature is shifted with respect to the two-line structure, thus looking different than a realistic bridge. The synthetic defective image 612 generated as such thus appears unnatural and unreal, as opposed to an actual defective image with a bridge, such as the original image 602. Thus, the synthetic defective image 612 may result in degraded performance when being used for defect-related examination.

In comparison, when using the currently proposed image-matching based augmentation, a set of candidate areas that matches the contextual region in accordance with a matching measure can be identified, and one candidate area 616 from the set can be selected (e.g., either randomly or based on the level of similarity of each candidate area in the set).

The first region 604 is thus pasted with respect to the candidate area 616 in accordance with a relative position between the first region and the candidate area/the second region. The synthetic defective image 614 generated as such appears natural and close to an actual defective image, as the pasted defective feature exactly connects two line structures, thus constituting a bridge in the target image, as opposed to the synthetic defective image 612 where the bridge is shifted from the two line structures.

As illustrated in the target image 610, two line structures 618 with a larger distance/gap in-between, are also present, as compared to the distance between the line structures in the original image 602. Through the proposed image matching such as, e.g., correlation-based matching, no candidate areas were identified across the two line structures 618 since no image portions in this area meet the matching criterion, e.g., the correlation threshold, due to the larger gap. However, in some cases, it may be desired to implant a similar defective feature in such an area. As described above, feature-based matching, such as SIFT, which is invariant to scaling, can be used in such cases. For instance, the larger gap can be regarded as a scaled version of the gap presented in the original image 602. By using SIFT, candidate area(s) can be identified as matching the contextual region in the area across the two line structures 618. The first region can be first transformed to a similar larger scale, and then pasted with respect to the candidate area(s) (not illustrated in the figure). Therefore, using feature-based matching in the present disclosure can expand the applicability of the proposed augmentation, and enable implanting a defective feature in areas which present pattern variations, thus were previously not possible to be considered as matching candidates for such image augmentation.

According to certain embodiments, one or more image characteristics of the first region or part thereof can be manipulated before being pasted in the target image. By way of example, the manipulation can be based on at least one of the following: geometric transformation, gray level intensity modifications, filtration, style transfer, and contrast modifications, etc. For instance, a geometric transformation between the two images can be estimated by determining transformation parameters representative of an affine transformation, including translation, rotation, scaling, shear mapping, etc., and the first region can be adjusted in accordance with the estimated geometric transformation.

Turning now to FIG. 3, there is illustrated a generalized flowchart of pasting the defective feature in the target image in accordance with certain embodiments of the presently disclosed subject matter.

In some cases, instead of pasting the entire first region containing the defective feature in the target image, it is possible to paste the defective feature itself in the target image. Specifically, an image patch representative of the defective feature can be extracted (302) from the original image. By way of example, the image patch can be extracted by subtracting a reference image from the original image. The reference image refers to a defect-free image corresponding to the original image. For instance, the reference image can be captured by the examination tool from one or more reference areas of an inspection area (such as, e.g., one or more neighboring dies of an inspection die in D2D inspection) which are known to be defect-free. The reference image can also be any inspection image which is verified as not containing any defective features. Alternatively, the reference image can be simulated based on design data of the specimen, similarly as described above with reference to the target image.

By way of another example, the image patch can be extracted by subtracting a reference region from the second region. The reference region can be selected from the one or more candidate areas as selected during the image matching, as described above with reference to block 208 of FIG. 2. The selected candidate areas are defect free and have a high similarity with respect to the second region.

The image patch, instead of the entire first region, can be pasted (304) with respect to the one or more candidate areas as selected in accordance with a relative position between the first region which encloses the defective feature, and the second region.

Figure 7:
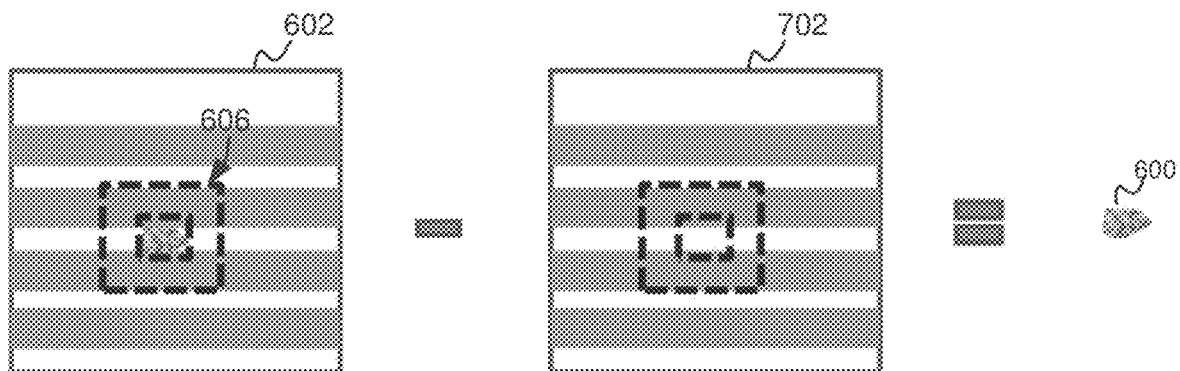
FIG. 7 shows an exemplary extraction of a defective feature in accordance with certain embodiments of the presently disclosed subject matter.

FIG. 7 illustrates an exemplary extraction of a defective feature in accordance with certain embodiments of the presently disclosed subject matter.

The original image 602 and a reference image 702 of the original image are illustrated. The reference image 702 is a defect-free image corresponding to the original image, as described above. The reference image 702 can be subtracted from the original image 602, thereby obtaining an image patch representative of the defective feature 600 itself. Alternatively, a reference region of the second region 606 can be obtained from one of the candidate areas identified and selected in the target image 610, such as the candidate area 616. The reference region can be subtracted from the second region, giving rise to an image patch representative of the defective feature 600. The image patch can be pasted on the target image at the selected candidate area 616.

By pasting the defective feature itself instead of the entire first region 604, the synthetic defective image is cleaner (e.g., has less image artifacts) and accurate. This is because certain margin areas of the first region which were unavoidably enclosed in the first region during annotation, such as, e.g., the top and bottom areas of first region 604 which include parts of the line structures, are not pasted in the target image, therefore rendering the augmented target image to be cleaner and closer to the actual defective image. It is to be noted that, in some cases, the reference image and the original image may need to be pre-processed, including, such as, e.g., image registration, and/or noise filtration, etc., before subtraction, to increase the accuracy of the subtracted defective feature.

In some cases, a group of original images can be obtained, each having at least a respective first region annotated as enclosing a respective defective feature. The process described above with reference to FIG. 2 can be repeated for each original image with respect to the target image, giving rise to a group of augmented target images each having at least one respective defective feature.

Referring now to FIG. 5, there is illustrated a generalized flowchart of training a machine learning model using the synthetic defective image in accordance with certain embodiments of the presently disclosed subject matter.

Upon generating a synthetic defective image (i.e., the augmented target image), label data can be provided for the synthetic image. By way of example, a defect label can be associated (502) (e.g., by the training module 108 in the PMC 102) with the first region or part thereof (e.g., the defective feature itself) as pasted in the augmented target image. For instance, the first region or the defective feature itself can be tagged with a defect label indicative of presence of a DOI. In another example, the first region or the defective feature itself can be tagged with a defect label indicative of the class of the defective feature. The class can be indicative of the type of the DOI, such as a bridge, a particle, an opening, etc.

The augmented target image and the associated defect label can be included (504) (e.g., by the training module 108 in the PMC 102) in a training set, which may possibly include additional defective images, being either actual images and/or synthetic images. The training set can be used (506) to train a machine learning (ML) model (such as e.g., the ML module 110 in the PMC 102).

The ML model can be trained in supervised learning. By way of example, the synthetic defective image is fed into the ML model to be processed. The output of the ML model can be predicted label data indicative the presence of a defect and/or the class thereof in the input image. For instance, the predicted label data can be in the form of a label map corresponding to the input image. The predicted label data is evaluated with respect to the ground truth label data of the input image using at least one loss function (also referred to as a cost function). The loss function can be, e.g., a difference metric configured to represent a difference between the predicted label data and the ground truth label data. The ML model can be optimized by minimizing the value of the loss function. Training can be determined to be complete, e.g., when the value of the loss function is less than a predetermined value, or when a limited change in performance between iterations is achieved. It is to be noted that the term "minimize" or "minimizing" used herein refers to an attempt to reduce a difference value represented by the loss function to a certain level/extent (which can be predefined), but do not necessarily have to reach the actual minimum.

As described above, the ML model can be implemented as various supervised learning models. In one example, the ML model can be implemented as a convolutional neural network (CNN). CNN normally has a structure comprising an input and an output layer, as well as multiple hidden layers. Training of the CNN can be performed by iteratively adjusting the weights and/or threshold values of the CNN using back propagation during each epoch, so that the prediction matches the ground truth (i.e., the loss function is minimized to a certain level/threshold). After the weight adjustment in each epoch, the CNN improves in terms of prediction accuracy, and eventually it achieves an optimal set of weights in a trained model meeting the performance requirements.

Once the ML model is trained, it can be tested and validated using additional datasets. If the prediction performance during test and validation meets the requirements, the trained ML model can be then deployed in runtime for defect examination.

The defect examination referred to herein can include one or more of the following operations: defect detection, defect review, and defect classification. Defect detection refers to capturing inspection images of a specimen and detecting potential defects (i.e., defect candidates) based on the images. The output of the ML model in such cases can be a defect map indicative of defect candidate distribution on the semiconductor specimen. Defect review refers to capturing review images (typically with higher resolution) at locations of the respective defect candidates, and reviewing the review images for ascertaining whether a defect candidate is indeed a DOI. The output of the ML model in such cases can be label data respectively associated with the defect candidates, the label data informative of whether each defect candidate is a DOI. In some cases, defect classification is performed in addition to the defect review (DR) process. In such cases, the ML model can provide label data informative of the classes or the types of the DOIs.

Additionally or alternatively, the generated synthetic images can be used for other defect-related examination applications as well. By way of example, in some embodiments, defect detection can be performed on the augmented target image using a previously generated detection algorithm, and it can be determined whether to modify the detection algorithm based on results of the defect detection.

It is to be noted that examples illustrated in the present disclosure, such as, e.g., the exemplary defective features, the exemplified matching techniques for image matching, the exemplified ML models etc., are illustrated for exemplary purposes, and should not be regarded as limiting the present disclosure in any way. Other appropriate examples/implementations can be used in addition to, or in lieu of the above.

Among advantages of certain embodiments of the presently disclosed subject matter as described herein is providing an enhanced "cut and paste" image augmentation process capable of generating synthetic defective images with high authenticity and closeness with respect to actual defective images. This is enabled at least by identifying best candidate locations in a target image for pasting the defective feature using image matching of a contextual region of the defective feature. Using the proposed augmentation process, the defective feature (or the first region enclosing it) can be pasted in areas having similar context/background as of the contextual region of the defective feature as defined in the original image, thus enabling the pasted defective feature to appear natural and authentic in the target image.

In particular, the defective feature can be extracted from the original image by using a reference image of the original image or a reference region of the second region. Pasting of the defective feature extracted as such (instead of pasting the first region) can avoid unnecessary image artifacts which may be caused by pasting the first region enclosing the defective feature, thus increasing the accuracy and authenticity of the augmented image.

In addition, using feature-based matching measures for image matching can expand the applicability of the proposed augmentation and enable implanting a defective feature in areas which present pattern variations with respect to the original image, thus previously were not possible to be considered as matching candidates for such image augmentation.

Among further advantages of certain embodiments of the presently disclosed subject matter as described herein is the ability to enrich a training set with the synthetic defective images generated as described above, thus providing sufficient training data for training a ML model in terms of quantity, quality, and variety, with a controlled amount of variance.

Among further advantages of certain embodiments of the presently disclosed subject matter as described herein is that training the ML model in supervised learning using the enriched training set, including the synthetic defective images generated as described above, improves the generalization capabilities and robustness of the ML model with respect to real production data, and increases the defect detection performance in terms of detection sensitivity, capture rate, and precision, etc.

It is to be understood that the present disclosure is not limited in its application to the details set forth in the description contained herein or illustrated in the drawings.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

What is claimed is:

1. A computerized system for defect examination on a semiconductor specimen, the system comprising a processor and memory circuitry (PMC) configured to:
    obtain an original image of the semiconductor specimen acquired by an examination tool, the original image having a first region annotated as enclosing a defective feature;
    specify a second region in the original image containing the first region, giving rise to a contextual region of the defective feature between the first region and the second region;
    identify, in a target image of the semiconductor specimen, a set of candidate areas matching the contextual region in accordance with a computer-based matching measure;
    select one or more candidate areas from the set of candidate areas; and
    paste the first region or part thereof representative of the defective feature in the target image with respect to the one or more candidate areas, to generate an augmented target image, the augmented target image being a synthetic defective image to be included in a training set for training a machine learning (ML) model for defect examination on the semiconductor specimen.

2. The computerized system according to claim 1, wherein the PMC is further configured to extract, from the original image, an image patch representative of the defective feature, and wherein the pasting comprises pasting the image patch with respect to the one or more candidate areas in accordance with a relative position between the first region and the second region.

3. The computerized system according to claim 2, wherein the image patch is extracted by subtracting a reference image from the original image, the reference image being a defect-free image corresponding to the original image.

4. The computerized system according to claim 2, wherein the image patch is extracted by subtracting a reference region from the second region, the reference region being selected from the one or more candidate areas.

5. The computerized system according to claim 1, wherein the second region is specified based on one of: a contextual pattern of the defective feature, or a predetermined parameter indicative of a distance between contours of the first region and the second region.

6. The computerized system according to claim 1, wherein the matching measure is correlation-based matching, and the set of candidate areas are identified by performing cross-correlation between the contextual region and the target image, and selecting the set of candidate areas meeting a predetermined correlation threshold.

7. The computerized system according to claim 1, wherein the matching measure is feature-based matching, and the one or more candidate areas are identified by identifying, respectively for the contextual region and the target image, one or more key points invariant to pattern variations, computing respective local descriptors characterizing the key points of the contextual region and the target image, and comparing the respective local descriptors to find matching key points between the contextual region and the target image.

8. The computerized system according to claim 1, wherein the one or more candidate areas are selected from the set of candidate areas in accordance with one of: level of similarity with respect to the contextual region, or random selection.

9. The computerized system according to claim 1, wherein the PMC is further configured to manipulate one or more image characteristics of the first region or part thereof based on at least one of: geometric transformation, gray level intensity modifications, filtration, style transfer, and contrast modifications, before the pasting.

10. The computerized system according to claim 1, wherein the PMC is configured to obtain a group of original images each having a respective first region annotated and enclosing a respective defective feature, and the PMC is configured to perform the specifying, identifying, selecting and pasting for each original image with respect to the target image, giving rise to a group of augmented target images, each augmented with at least one defective feature.

11. The computerized system according to claim 1, wherein the PMC is further configured to associate a defect label with the first region or part thereof in the augmented target image, include the augmented target image associated with the defect label in the training set, and use the training set to train the ML model.

12. The computerized system according to claim 1, wherein the PMC is further configured to perform defect detection on the augmented target image using a detection algorithm, and determine whether to modify the detection algorithm based on a result of the defect detection.

13. A computerized method for defect examination on a semiconductor specimen, the method comprising:
    obtaining an original image of the semiconductor specimen acquired by an examination tool, the original image having a first region annotated as enclosing a defective feature;
    specifying a second region in the original image containing the first region, giving rise to a contextual region of the defective feature between the first region and the second region;
    identifying, in a target image of the semiconductor specimen, a set of candidate areas matching the contextual region in accordance with a computer based matching measure;
    selecting one or more candidate areas from the set of candidate areas; and
    pasting the first region or part thereof representative of the defective feature in the target image with respect to the one or more candidate areas, to generate an augmented target image, the augmented target image being a synthetic defective image to be included in a training set for training a machine learning (ML) model for defect examination on the semiconductor specimen.

14. The computerized method according to claim 13, further comprising: extracting, from the original image, an image patch representative of the defective feature, and wherein the pasting comprises pasting the image patch with respect to the selected candidate areas in accordance with a relative position between the first region and the second region.

15. The computerized method according to claim 14, wherein the image patch is extracted by subtracting a reference image from the original image, the reference image being a defect-free image corresponding to the original image.

16. The computerized method according to claim 14, wherein the image patch is extracted by subtracting a reference region from the second region, the reference region being selected from the one or more candidate areas.

17. The computerized method according to claim 13, wherein the second region is defined based on one of: a contextual pattern of the defective feature, or a predetermined parameter indicative of a distance between contours of the first region and the second region.

18. The computerized method according to claim 13, wherein the matching measure is feature-based matching, and the one or more candidate areas are identified by identifying, respectively for the contextual region and the target image, one or more key points invariant to pattern variations, computing respective local descriptors characterizing the key points of the contextual region and the target image, and comparing the respective local descriptors to find matching key points between the contextual region and the target image.

19. The computerized method according to claim 13, further comprising: associating a defect label with the first region or part thereof in the augmented target image, including the augmented target image associated with the defect label in a training set, and using the training set to train the ML model.

20. A non-transitory computer readable storage medium tangibly embodying a program of instructions that, when executed by a computer, cause the computer to perform a method for defect examination on a semiconductor specimen, the method comprising:

obtaining an original image of the semiconductor specimen acquired by an examination tool, the original image having a first region annotated as enclosing a defective feature;

specifying a second region in the original image containing the first region, giving rise to a contextual region of the defective feature between the first region and the second region;

identifying, in a target image of the semiconductor specimen, a set of candidate areas matching the contextual region in accordance with a computer-based matching measure;

selecting one or more candidate areas from the set of candidate areas; and pasting the first region or part thereof representative of the defective feature in the target image with respect to the one or more candidate areas, to generate an augmented target image, the augmented target image being a synthetic defective image to be included in a training set for training a machine learning model for defect examination on the semiconductor specimen.

* * * * *